Patented Jan. 4, 1927.

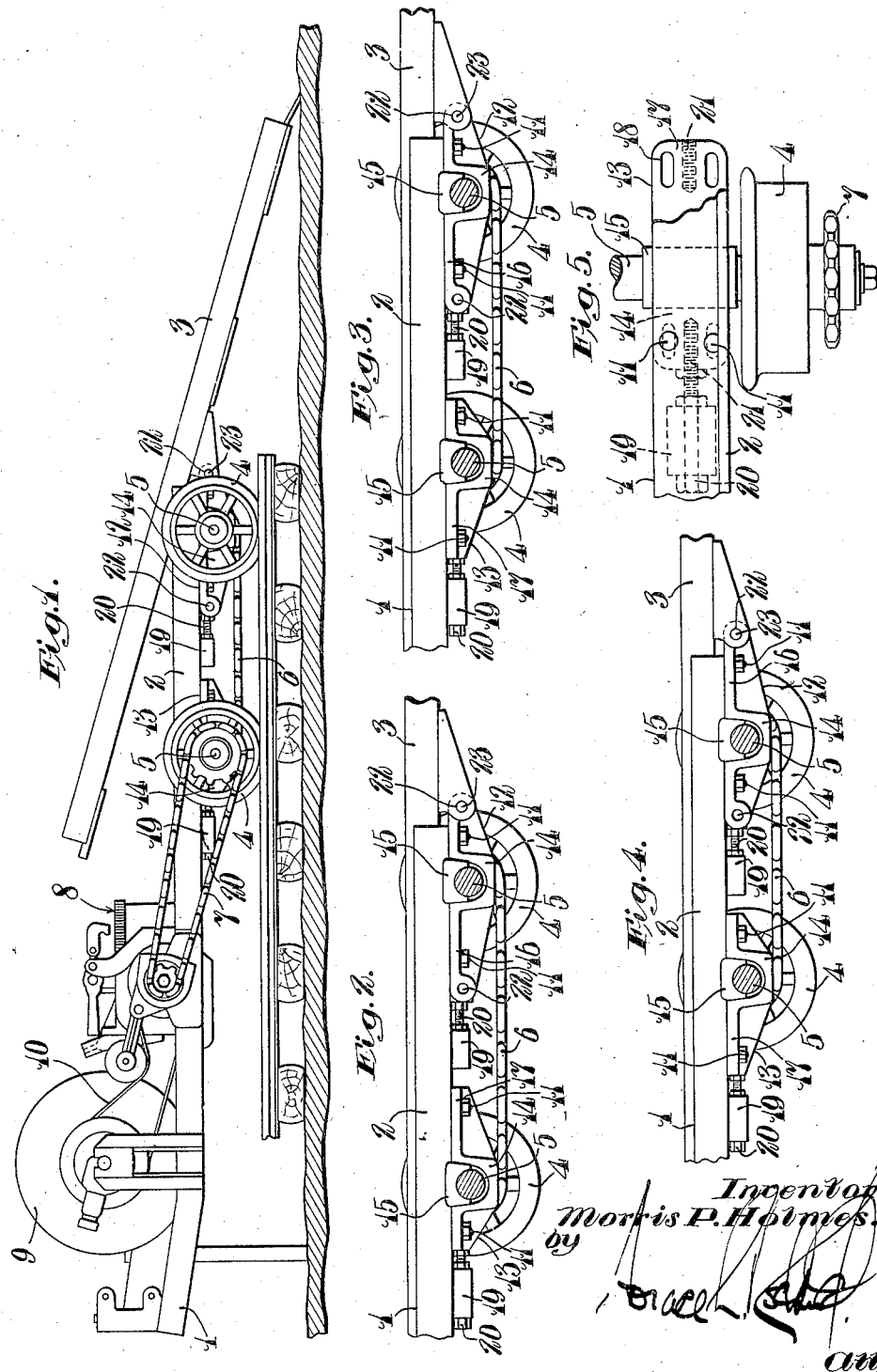

1,613,106

UNITED STATES PATENT OFFICE.

MORRIS P. HOLMES, OF CLAREMONT, NEW HAMPSHIRE, ASSIGNOR TO SULLIVAN MACHINERY COMPANY, A CORPORATION OF MASSACHUSETTS.

TRUCK.

Application filed May 28, 1923. Serial No. 641,890.

My invention relates to trucks, and more particularly to transport trucks for mining machines.

An object of my invention is to provide an improved truck. Another object of my invention is to provide improved means whereby a truck may be adapted to use on tracks having curves of different radii. A further object of my invention is to provide an improved mining machine truck adapted to meet the requirements of different mine conditions. Other objects and advantages of my invention will hereinafter more fully appear.

In the accompanying drawings I have shown for purposes of illustration one embodiment which my invention may assume in practice.

In these drawings—

Fig. 1 is a side elevation of a mining machine truck incorporating my improvement.

Figs. 2, 3, and 4 are detail views, partially in section, the wheels being shown adjusted in position for different wheel bases.

Fig. 5 is a detail plan view showing the arrangement of the wheel and wheel carrying member.

In this illustrative form of my invention I have shown a mining machine truck 1 of generally standard form, comprising a rigid body portion 2 and a tilting front portion 3 adapted to receive and support a mining machine (not shown) in a well known manner. Disposed beneath the rigid body portion 2 are truck wheels 4 which, as in usual construction, are for traction purposes and are arranged close together substantially beneath the center of gravity of the truck when the mining machine is mounted for transport thereon. The truck wheels are mounted on axles 5 having driving connections, herein chain and sprocket connections 6 and 7, respectively, which cooperate with truck driving mechanism, generally designated 8, adapted to be driven from the mining machine in any approved manner. Disposed at the rear of the rigid body portion is a cable reel 9 herein carried on the body portion and having suitable driving connections, including a belt 10, with the truck driving mechanism.

In my improved construction it will be noted that disposed beneath the rigid body portion of the truck are suitably secured, herein by carriage bolts 11, front and rear wheel carrying members 12 and 13, respectively, which comprise brackets 14 having bearing blocks 15 offset from the longitudinal center thereof within which the axles 5 are journaled, and elongated portions 16 and 17 respectively formed thereon, on one side of the bearing blocks. The brackets 14 have slots 18 on the upper sides with which the bolts 11 cooperate to provide means for tightening the driving chains. Suitably secured to the rigid body 2 are blocks 19 having set screws 20 arranged therein adapted to threadedly engage the wheel carrying members, as at 21, to hold them in adjusted position. The front brackets 14 have apertures 22 formed in each end thereof adapted to receive pins 23 which form pivots for the tilting front portion 3 of the truck. By removing the screws 11 and 20 (see Fig. 5) the brackets 14 may be removed and turned end to end bringing the offset bearing blocks 15 and the elongated portions 16, 17 nearer to or further away from one another, thereby decreasing or increasing the length of the wheel base as desired.

As a result of my improved construction it will be noted that it is possible for the wheel carrying members to be adjusted in a plurality of positions by a simple transposition of parts to meet the requirements of different mine conditions, for instance, when turning into room necks having curved tracks of different radii. Thus for example, in Fig. 2, the front and rear wheel carrying members are so arranged with the elongated portions turned inwardly toward one another, that the bearing blocks are spaced far apart with respect to one another, thereby producing a maximum length of wheel base, the elongated portions on the rear members then extending away from the front members. In Fig. 3 the rear wheel carrying members are shown turned end to end with respect to the front members while the latter are left arranged as shown in Fig. 2, and the rear axle bearing blocks thus being moved longitudinally with respect to the truck body in such manner as to produce another and shorter length of wheel base. In Fig. 4, the front wheel carrying members are transposed end to end with respect to the rear members while the latter are left as shown in Fig. 3 the elongated portions on the front members then being extended forwardly and the pivots for the tilting portion of the truck being farthest away from the front axle at this time, while the front bearing blocks are moved longitudinally relative to the truck body and nearer to the rear members in such manner as to produce still another or minimum length of wheel base. In all of the adjusted positions of the axles a relatively slight longitudinal adjustment of any axle may be obtained by means of the bolt and slot connection 11, 18 for taking up excess slack in the driving chain, the set screws holding them in the desired adjusted positions. It is clearly evident from the foregoing description that my improved construction enables a variable wheel base to be produced which is not only of an exceedingly rugged character and well adapted to the adjustments of the manufacturer or user, but which may also be manufactured at a small expense and applied to a truck of standard form.

While I have in this application specifically described one form which my invention may assume in practice, it will be understood that this form is shown for purposes of illustration and that the invention may be modified and embodied in various other forms without departing from its spirit or the scope of the appended claims.

What I claim as new and desire to secure by Letters Patent is:

1. In a truck, a truck body, and wheel means thereon including wheel carrying members each adjustable in different end to end relations to produce different wheel bases.

2. In a truck, a truck body, wheel carrying members disposed beneath said body and provided at longitudinally spaced points with means to enable attachment to said body and having axle bearing members offset longitudinally from a line midway between the longitudinally spaced points aforesaid, and means to adjust said bearing members relative to said truck body.

3. In a truck, a truck body, and wheel means therefor including a plurality of wheel carrying members having longitudinally offset axle bearings transposable in different relative positions.

4. In a truck, a truck body, and wheel means therefor including a plurality of wheel carrying members transposable relative to each other having longitudinally offset axle bearing members, and means to adjust said wheel carrying members.

5. In a truck, a truck body, and wheel means therefor including a plurality of wheel carrying members having longitudinally offset axle bearings and each bodily transposable relative to said truck body.

6. In a truck, a truck body, wheel carrying members carried by said truck body and formed asymmetrically with respect to the vertical planes of the wheel axes, means to adjust said members into different relations to produce wheel bases of substantially different length, and means for adjusting said members longitudinally when in different relations.

7. In a truck, a truck body, means for varying the wheel base including front and rear sets of wheel carrying members normally giving one wheel base, and means whereby transposing one set of members gives another wheel base, and supplemental means for adjusting said members longitudinally.

8. In a truck, a truck body, wheel carrying members disposed beneath said body and having axle bearing members offset longitudinally from the longitudinal center thereof, and means to adjust said wheel carrying members in different end to end relations.

9. In a truck, a truck body, wheel means thereon including wheel carrying members adjustable in different end to end relations. and means to hold said members in adjusted position, said wheel carrying members being provided at longitudinally spaced points therealong with means cooperating with said holding means, one of said points being nearer the axis of wheel rotation than the other.

10. In a truck, a truck body provided with a tiltable portion, wheel means thereon including front and rear wheel carrying means adjustable in different end to end relations, and means to pivot said tiltable portion on said front wheel carrying means.

11. In a truck, a truck body provided with a tiltable portion, wheel means thereon including front and rear wheel carrying means adjustable in different end to end relations, and means to pivot said tiltable portion on said front wheel carrying means in different end to end relations thereof.

12. In a truck, a truck body provided with a tiltable portion, and running gear including wheel carrying members, one of which is adjustable into different end to end relations relative to another and provides pivot means for said tiltable portion in each relation thereof. said pivot means being so disposed on said wheel carrying member that the pivotal axis of said tiltable portion bears substantially the same relation to said body in either of said end to end relations.

In testimony whereof I affix my signature.

MORRIS P. HOLMES.